Jan. 17, 1956  R. B. KLEIN  2,730,943
FREEZE-PROOF VENT DAMPER
Filed March 16, 1953
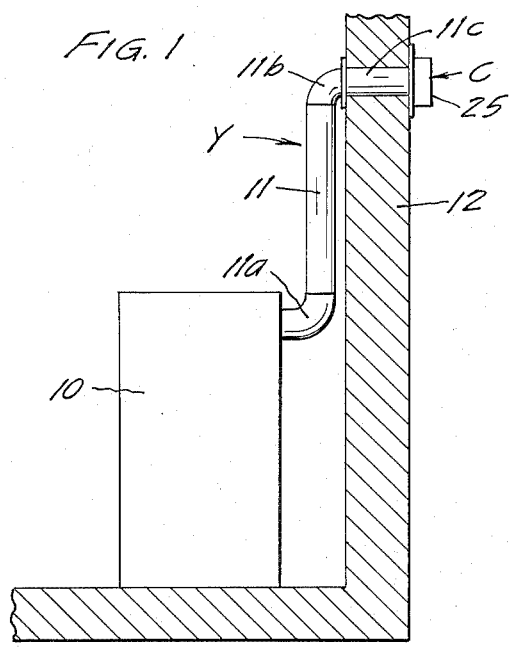
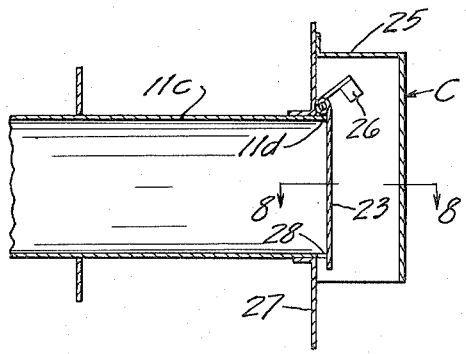
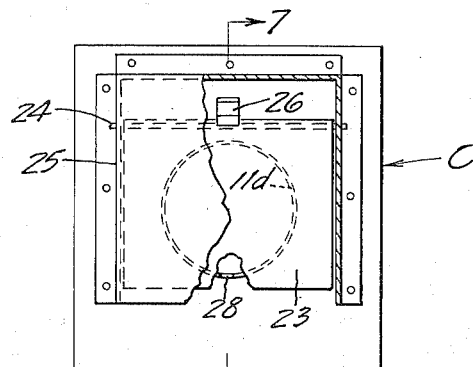
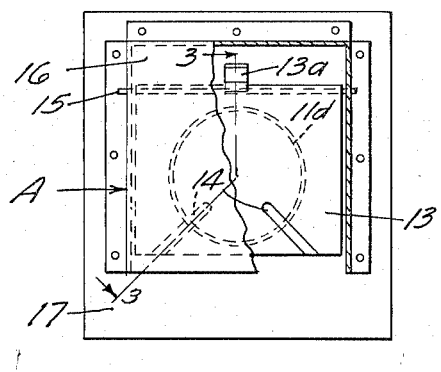
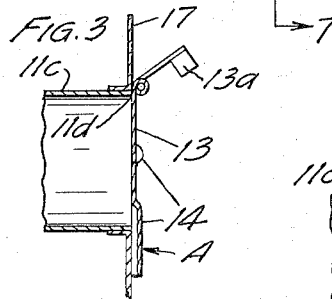
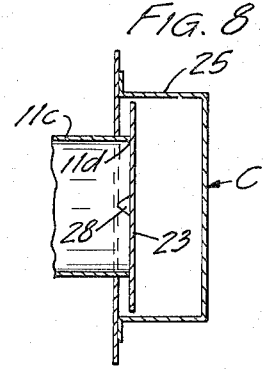
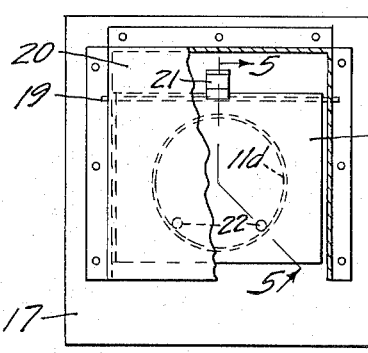
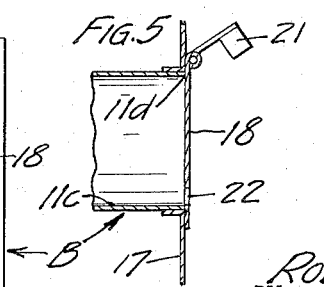
INVENTOR.
ROBERT B. KLEIN
BY
Williamson, Williamson, Schroeder, & Adams
ATTORNEYS

United States Patent Office 2,730,943
Patented Jan. 17, 1956

2,730,943

FREEZE-PROOF VENT DAMPER

Robert B. Klein, Minneapolis, Minn.

Application March 16, 1953, Serial No. 342,399

6 Claims. (Cl. 98—119)

This invention relates generally to vent dampers and is an improvement over my invention entitled "Discharge Outlet Vent" disclosed and claimed in my copending application for United States Letters Patent, Serial Number 221,622, filed April 18, 1951, now abandoned.

While the structure disclosed in my copending application has proved very satisfactory, a problem of the damper element freezing shut in cold weather has become evident. After the clothes drier is shut off, the damper element is shifted into closed position and moisture condenses on the metal parts which are exposed to the outside since moist warm air within the conduit cools, this condensation, of course, freezes and, under certain conditions, prevents opening of the damper element when the drier is again put into use since the warm air produced in the drier cannot reach the damper element if the cold air then present in the conduit cannot escape. This is especially true where the installation has required a relatively long conduit as is shown in Figure 1.

It is an object of my present invention to provide a freeze-proof vent damper having provision to permit the warm air discharged from the drier to reach the frozen portions of the air guiding and confining assembly to melt the ice collected thereon and free the damper element to permit the same to shift into open position.

It is another object to provide an air guiding and confining assembly for carrying the moisture laden air from the drier and discharging the same to the outside which has an opening at the discharge portion thereof to permit restricted flow of air under pressure therethrough and thus permit the warm air produced by the drier to reach the discharge end of said assembly and free the damper to permit the same to be opened.

More specifically, it is an object to provide, in certain forms of my invention to be disclosed herein, a vent damper element having portions thereof formed to produce a bleed opening to permit limited flow of air under pressure therethrough.

It is another object to provide one form of my invention having the discharge end of the conduit extended outwardly beyond the outside wall and having a small opening formed in the discharge end portion of the conduit to provide a bleed opening adjacent the damper.

These and other objects and advantages of my invention will more fully appear from the following description made in connection with the accompanying drawings wherein like reference characters refer to the same or similar parts throughout the several views and in which:

Figure 1 is a diagrammatic view showing a typical installation of a vent for a clothes drier;

Figure 2 is an elevational view of the discharge end of my vent assembly with a portion of the deflector hood broken away to show one form of my freeze-proof vent damper;

Figure 3 is a fragmentary sectional view taken substantially along the line 3—3 of Figure 2 and showing one of the pressed out portions in longitudinal section and the other in transverse elevation;

Figure 4 is an elevational view similar to Figure 2 showing an alternative form of my invention;

Figure 5 is a fragmentary sectional view taken substantially along the line 5—5 of Figure 4;

Figure 6 is an elevational view similar to Figures 2 and 4 showing still another form of my invention;

Figure 7 is a vertical sectional view taken substantially along the line 7—7 of Figure 6; and Figure 8 is a horizontal sectional view taken substantially along the line 8—8 of Figure 7.

Figure 1 illustrates a conventional clothes drier designated by the numeral 10. A suitable air guiding and confining assembly designated as an entirety by the letter Y is provided for carrying the moist lint-containing air discharged from the drier to the outside through the wall of a building, said wall being designated by the numeral 12.

The air guiding and confining assembly includes a hollow conduit member 11 having, in the form shown, elbows 11a and 11b with a short section of said conduit 11c extending through the wall 12 as shown in Figure 1. Three different forms of my invention are illustrated, form A shown in Figures 2 and 3, form B shown in Figures 4 and 5 and form C shown in Figures 6, 7 and 8. In form A of my invention, a portion of the air guiding and confining assembly Y consists in a closure damper or flap valve 13 shiftably mounted relative to the discharge end 11d of conduit section 11c. This damper is provided with substantially radially disposed pressed-out portions 14 which provide bleeder passages through which a limited amount of air is free to flow even though the damper closure 13 is held shut even when the drier is in operation. In the form shown, the damper 13 is hinged on a horizontal hinge pin 15 which extends through suitable apertures provided in the sides of a deflector hood 16, as best shown in Figure 2. A weight 13a is provided to normally maintain the damper 13 in closed position, but permitting the same to swing upwardly into open position in response to the force of the discharge air under pressure from the drier 10. Suitable means for anchoring the conduit section 11c to the outside of the building wall 12 are provided such as the attachment flange 17 which is securely fixed to the discharge end of the conduit 11c. In forms A and B of my invention, the outer surface of this flange 17 lies in the plane defined by the discharge end of said conduit section 11c, as best shown in Figures 3 and 5.

In form B of my invention, a closure damper or flap valve 18 is provided and is similarly mounted to damper 13 in the form shown, on a hinge pin 19 pivoted to hood 20. A weight 21 normally holds the damper 18 in closed position and, as has been previously stated, an attachment flange 17 securely anchors the conduit section 11c to the wall. In form B of my invention, the restricted bleed openings are provided by apertures 22 formed through the damper 18 adjacent the periphery of the discharge end 11d of conduit section 11c and disposed within the confines of said periphery as best shown in Figures 4 and 5.

In form C of my invention, an imperforate damper or flap valve 23 is hingedly mounted on hinge pin 24 pivoted to hood 25 and said damper is normally held in closed position by weight 26. In this form of my invention, an attachment flange 27 is provided for attaching the conduit section 11c to the outside wall of the building and, this flange 27 is connected to the conduit section 11c in slightly spaced relation to the outer discharge end 11d of said conduit to provide a free edge portion extending outwardly beyond the outer surface of said attachment flange 27. The restricted bleed or discharge opening is provided by a notch 28 formed in the lower portion of this outwardly extending free edge to permit restricted air flow under pressure therethrough.

In all three forms of my invention it will be seen that I have provided a relatively simple, yet highly efficient, means for permitting a limited flow of air under pressure from the clothes drier blower to bleed outwardly and thus force out of the conduit 11 all of the cold air which accumulates therein between operations of the drier 10 and permits the warm air to flow upwardly and melt any ice which may have formed around the damper to thus free the damper and permit the same to be swung outwardly in the normal manner. Form A of my invention consists in one or more smoothly contoured grooves 14 which are particularly designed to prevent the collection of lint thereon. The apertures 22 may be formed as shown in Fig. 5 or if desired the material of the flap valve 18 closely adjacent the said apertures may be pressed out (not shown) to provide minimum resistance to the flow of lint-containing air therethrough and the notch 28 in form C of my invention may be made of sufficient size to prevent clogging thereof by collection of lint along the edge portions.

It will, of course, be understood that various changes may be made in the form, details, arrangement and proportions of the parts without departing from the scope of my invention which, generally shown, consists of the matter stated and described herein and set forth in the appended claims.

What I claim is:

1. A freeze-proof vent for a laundry drier having a horizontal conduit member communicating with the atmosphere at its outer end for exhaust of moisture laden air, a flap valve member pivotally mounted adjacent the outer end of said conduit member for free swinging movement to contact the peripheral edge of said end to close said outer end, one of said members being formed to provide a passageway between itself and the other member to provide a vent from said conduit member adjacent the peripheral edge of the outer end of said conduit member when said flap valve member is in its closed position thereby permitting constant venting of air in the conduit member through the vent, warm air from the laundry drier carrier through said conduit member melting any ice holding said flap valve member in closed position and thus allowing the flap valve member to be swingably moved away from the end of the conduit to allow a greater volume of warm air to be discharged to the atmosphere.

2. A freeze-proof vent for a laundry drier having a horizontal conduit member communicating with the atmosphere at its outer end for exhaust of moisture laden air, a flap valve member pivotally mounted adjacent the outer end of said conduit member for free swinging movement to contact the peripheral edge of said end to close said outer end, one of said members being provided with a passageway to provide a vent from said conduit member adjacent the peripheral edge of the outer end of said conduit when said flap valve member is in its closed position thereby permitting constant venting of air in the conduit member through the vent, warm air from the laundry drier carried through said conduit member melting any ice holding said flap valve member in closed position and thus allowing the flap valve member to be swingably moved away from the end of the conduit member to allow a greater volume of warm air to be discharged to the atmosphere.

3. The structure as defined in claim 2 wherein the flap valve member is of a substantially flat material having at least one rib formed thereon, said rib formed on the face of the flap valve member adjacent the peripheral edge of the outer end of the conduit member and extending downwardly and beyond said peripheral edge forming with the outer end of said conduit member a vent.

4. The structure as defined in claim 2 wherein the flap valve member is of a substantially flat material having at least one rib formed thereon, said rib formed on the face of the flap valve member adjacent the peripheral edge of the outer end of the conduit member whereby said rib formation coacts with the edge of the conduit member to provide a vent for moisture laden air issuing from the conduit member.

5. The structure as defined in claim 2 wherein the passageway is an opening in said flap valve member within the confines of said outer end.

6. The structure as defined in claim 2 wherein the passageway is an opening adjacent the edge of said conduit member.

References Cited in the file of this patent

UNITED STATES PATENTS

| Number | Name | Date |
|---|---|---|
| 121,639 | Marriott | Dec. 5, 1871 |
| 1,064,951 | Wofford | June 17, 1913 |
| 1,487,828 | Ziganek et al. | Mar. 25, 1924 |
| 1,575,144 | Bishop | Mar. 2, 1926 |
| 1,993,069 | McConnell, Jr. | Mar. 5, 1935 |
| 2,397,803 | Murray et al. | Apr. 2, 1946 |
| 2,579,395 | Pfautsch | Dec. 18, 1951 |
| 2,641,987 | Burgan | June 16, 1953 |
| 2,656,784 | Benson | Oct. 27, 1953 |

FOREIGN PATENTS

| | | |
|---|---|---|
| 648,119 | Great Britain | Dec. 28, 1950 |